United States Patent [19]

Thaulez

[11] Patent Number: 4,716,009
[45] Date of Patent: Dec. 29, 1987

[54] DROPPED ROD PROTECTION INSENSITIVE TO LARGE LOAD LOSS

[75] Inventor: Francis R. Thaulez, Saint Paul, Belgium

[73] Assignee: Westinghouse Electric Corp., Pittsburgh, Pa.

[21] Appl. No.: 809,709

[22] Filed: Dec. 17, 1985

[51] Int. Cl.⁴ ............................................. G21C 7/36
[52] U.S. Cl. ..................................... 376/242; 376/216
[58] Field of Search ............... 376/215, 216, 219, 242, 376/254, 255

[56] References Cited

U.S. PATENT DOCUMENTS

| | | | |
|---|---|---|---|
| 3,997,767 | 12/1976 | Torres et al. | 376/242 |
| 4,046,625 | 9/1977 | Musick et al. | 376/242 |
| 4,399,095 | 8/1983 | Morris | 376/216 |
| 4,548,784 | 10/1985 | Watari | 376/216 |

Primary Examiner—Deborah L. Kyle
Assistant Examiner—Richard L. Klein
Attorney, Agent, or Firm—Daniel C. Abeles

[57] ABSTRACT

A protection system such for a nuclear power plant shuts down the reactor in response to the detection of a negative flux rate characteristic of a dropped rod, but inhibits the trip if the specified negative flux rate is preceded within a selected time interval by a positive flux rate characteristic of a net load rejection when the moderation temperature coefficient is highly negative.

9 Claims, 4 Drawing Figures

DROPPED ROD PROTECTION INSENSITIVE TO LARGE LOAD LOSS

FIELD OF THE INVENTION

This invention relates to apparatus and a method for protecting the reactor in a nuclear power plant from a dropped control rod condition and more particularly to providing such protection without responding unnecessarily to events which generate similar indications such as a large load loss.

PRIOR ART

One means for controlling the reactivity of a commercial nuclear reactor such as a pressurized water reactor (PWR) is through insertion of control rods into the reactor core. The control rods absorb neutrons to control the number of fission reactions. They are inserted into and withdrawn from the reactor core in controlled sequences to regulate the distribution of power in the core. However, the rods are incrementally stepped into and out of the core by electromechanical jacks which can, on occasion, malfunction resulting in the dropping of a rod into the core and thereby reducing the power output in the vicinity of the dropped rod. The nature of the operation of a PWR is such that the reactor attempts to make up for the local loss of reactivity caused by the dropped rod by increasing the power elsewhere in the core so that the demand placed upon the reactor is still met. This, in turn, can lead to local limits being exceeded in these other parts of the core.

One type of protection system provided on PWRs monitors the neutron flux and trips the reactor when a negative rate of change of flux in excess of a preselected value is detected. Such a negative rate of change in neutron flux can, for example, indicate a dropped rod since the inserted rod reduces the local reactivity and it takes time for the power to increase elsewhere in the core to return the power to the demanded level. Thus, by monitoring the rate of change of neutron flux, a dropped rod can be detected early enough that the reactor can be shutdown before local power limits are exceeded.

It is not necessary, however, to trip the reactor in response to a dropped rod if the local power peaks can be maintained below design limits. Accordingly, commonly owned U.S. Pat. No. 4,399,095 proposes that while the reactor should be shutdown upon the occurrence of a very large negative flux change, for a more moderate drop in power the reactor can continue to operate as long as the power does not exceed the reduced power level initially resulting from the dropped rod by a preselected amount. It also calls for limits on rod withdrawal and a rollback in turbine power to maintain reactor power below the new limit. In another protection system for dropped rods, which is disclosed in commonly owned U.S. patent application Ser. No. 731,259 filed on May 7, 1985, the reactor is not shutdown in the presence of a high negative flux rate as long as prescribed axial offset limits are not exceeded.

A protection system which relies upon the detection of a large negative flux rate as an indication of a dropped control rod can shutdown the reactor unnecessarily under certain conditions. Loss of the electrical load carried by the plant sets into motion a series of events which leads to the generation of a negative flux rate similar in magnitude to that generated by a dropped rod. However, load rejection does not generate the local power peaks which are of concern with a dropped rod and, hence, shutting down the reactor under these conditions is unnecessary and places an economic burden on the plant.

It is a primary object of the present invention to provide protection to the reactor of a nuclear power plant against dropped control rods without shutting down the reactor unnecessarily.

It is also an object of the invention to provide such protection through monitoring the negative flux rate in the reactor.

It is a more particular object of the invention to provide such protection which is insensitive to load rejection.

SUMMARY OF THE INVENTION

These and other objects are achieved by the invention by inhibiting shutdown of the reactor in a nuclear power plant in response to a negative neutron flux rate of a magnitude indicative of a dropped control rod when a net load rejection event has been detected. A loss of load by the plant results initially in an increase in reactor power which is detected by comparing the neutron flux rate to a setpoint of a preselected positive value. This initial increase in flux rate is followed by a negative flux rate similar in magnitude to that induced by a dropped rod. Thus, the invention includes a method and apparatus for not only comparing the neutron flux rate with a negative setpoint indicative of a dropped rod and shutting down the reactor when the flux rate is more negative than the negative setpoint value, but also for comparing the flux rate with the preselected positive setpoint and inhibiting shutdown of the reactor in response to a negative flux rate more negative than the negative setpoint which is preceded by a positive flux rate which exceeds the positive setpoint. Preferably, shutdown in response to an excessive negative flux rate is inhibited only for a period of time commensurate with the interval between the positive and negative flux rate peaks of a loss of load transient to minimize interruption of the dropped rod protection feature.

BRIEF DESCRIPTION OF THE DRAWINGS

A full understanding of the invention can be gained from the following description when read in conjunction with the accompanying drawings in which.

DESCRIPTION OF THE PREFERRED EMBODIMENT

Figure 1:
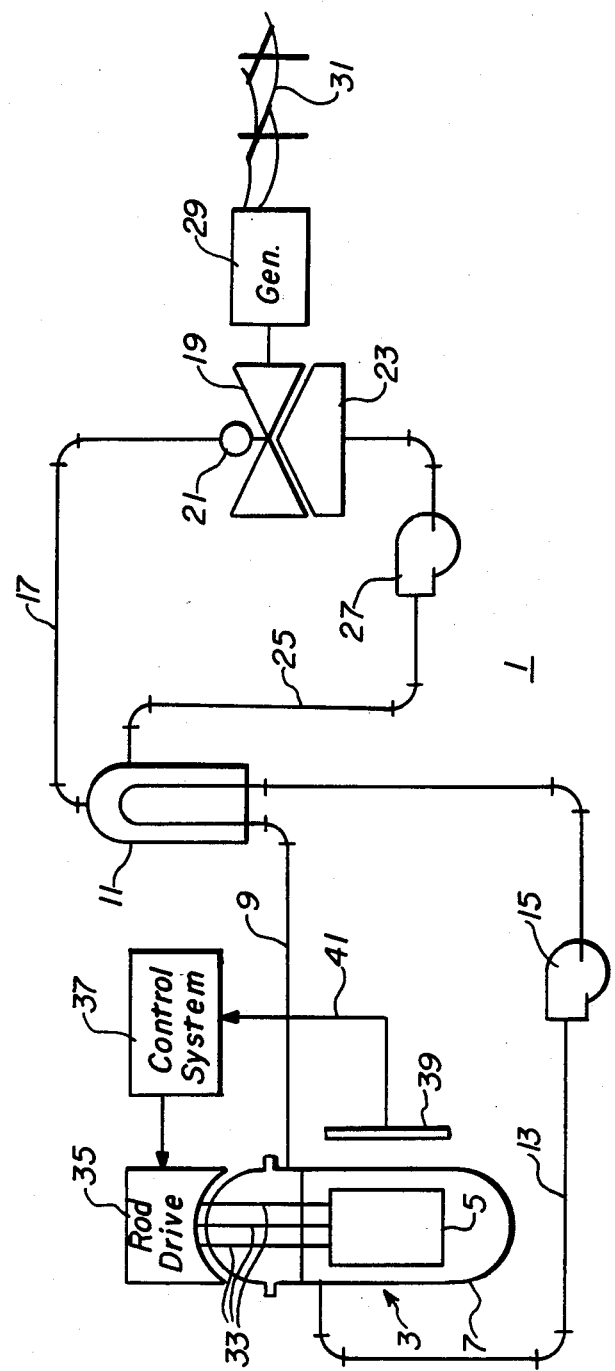
FIG. 1 is a simplified schematic diagram of a nuclear power plant incorporating the subject invention.

The invention will be described as applied to the pressurized water reactor (PWR) nuclear power plant illustrated in FIG. 1. The plant 1 includes a nuclear reactor 3 comprising a reactor core 5 mounted inside a pressure vessel 7. The reactor core 5 contains fissionable material in which sustained fission reactions occur to generate heat which is absorbed by a reactor coolant in the form of light water passed through the core 5. The reactor coolant is circulated in a primary loop 5 which includes a hot leg conduit 9 to convey the heated reactor coolant from the reactor core 5 to the primary side of a steam generator 11 where the heat is transferred to feed water on the secondary side to produce steam. The reactor coolant is returned to the reactor core 5 through a cold leg conduit 13 by a reactor coolant pump 15. While one primary loop is shown in FIG. 1 for illustration, in practice a typical PWR has two to four primary loops each supplying heated reactor coolant from the core 5 to its own steam generator.

The steam produced in the steam generator 11 is circulated in a secondary loop which includes steam header 17 which supplies steam to a turbine 19 through a throttle valve 21. Vitiated steam from the turbine is condensed in a condenser 23 and, in a very simplified way, the condensate is returned to the steam generator 11 through feedwater conduit 25 by feedwater pump 27. The turbine 19 drives a generator 29 to produce electricity which is applied to a power grid 31 which represents the load. The generator 29 also supplies electric power to the plant including the reactor coolant and feedwater pumps 15 and 27 respectively.

The power output of the plant 1 is determined by the reactivity of the reactor core 5. Long term adjustment of the reactivity is controlled by dissolving a neutron absorbing material such as boron in the reactor coolant which is circulated through the core. The reactor coolant also serves as a moderator to slow the fast neutrons released by the fission reactions down to the energy levels required for sustained fission. A PWR possesses a negative temperature coefficient in that as the water becomes cooler, and hence denser, it slows down more fast neutrons to the critical level for fission and thus increses the reactivity of the core.

The reactivity of the core 5 is also regulated by control rods 33 made of neutron absorbing material which are inserted into the core 5 vertically from above. The control rods 33 are positioned by a rod drive system 35 under the direction of a control system 37. Since the control rods 33 move in the axial direction within the core, they have an affect on the axial distribution of power within the core. The positioning of the control rods 33 is managed by the control system 37.

It has long been recognized that the power generated by a reactor 3 is proportional to the fast neutron flux escaping from the core 5. Hence, the power is typically measured by elongated neutron detectors 39 (one shown) extending vertically at spaced locations around the pressure vessel 7. The usual practice is to provide four such neutron detectors spaced evenly around the pressure vessel to generate four independent measurements of the neutron flux. The redundancy provided by the multiple detectors assures the reliability required for protection and control purposes. The flux measurements made by the neutron detector 39 are transmitted to the control system 37 over line 41.

Under normal operating conditions, radial power distribution within the core 5 is not a concern because movement of the control rods 33 is synchronized to provide symmetry about the longitudinal axis of the core. However, as mentioned previously, it is possible that that symmetry could be broken, for instance, by a dropped control rod. Due to the physics of a PWR, the dropped rod will cause an immediate decrease in the power generated in its vicinity which will initially result in a reduction in the total power generated by the core. The reactor will then attempt to meet the load placed upon it by the demand for steam in the secondary loops by increasing power in the remainder of the core which could lead to local overheating elsewhere in the core.

In the present invention, the negative rate of change of the fast neutron flux is monitored as in U.S. Pat. No. 4,399,095. However, novel means are used to determine whether a large negative flux rate is due to a dropped rod which requires the reactor to be shutdown, or whether the large negative flux rate is due to another event which does not warrant shutdown. More particularly, a net load rejection will eventually result in a negative flux rate of a magnitude similar to that caused by a dropped rod. This occurs because the large loss of load on the plant initially causes the turbine, and therefore the generator, to overspeed. Overspeed of the generator causes the frequency of the alternating current generated to increase. Since the generator is still supplying power to the plant even though the load on the grid is disconnected, the higher frequency of the power generated causes the reactor coolant pump 15 to overspeed. This in turn, increases the flow of reactor coolant through the core 5 thereby lowering its temperature which, as previously mentioned, increases the reactivity of the core due to its negative temperature coefficient. The increased reactivity results in a high positive flux rate as the power output of the core temporarily increases. By this time, however, a temperature increase due to the power imbalance, initiated in the steam generator, reaches the core and reduces its reactivity. Furthermore, speed controls on the turbine (not shown) become effective to close the throttle valve to the extent necessary to bring the speed of the turbine down toward the desired speed. At the same time, the control system 37 begins to reposition the control rods 33 to return the reactor coolant temperature to the reference value. The combined effect of these events is to cause reactor power to drop, generating a negative flux rate of a magnitude similar to that caused by a dropped rod. The biggest contributor is the temperature increase and the more negative the temperature coefficient is, the higher the magnitude of the negative flux rate. The phenomenon is exaggerated if the loss of load is caused by a fault in the grid which drags the frequency down prior to the disconnect.

Figure 2:
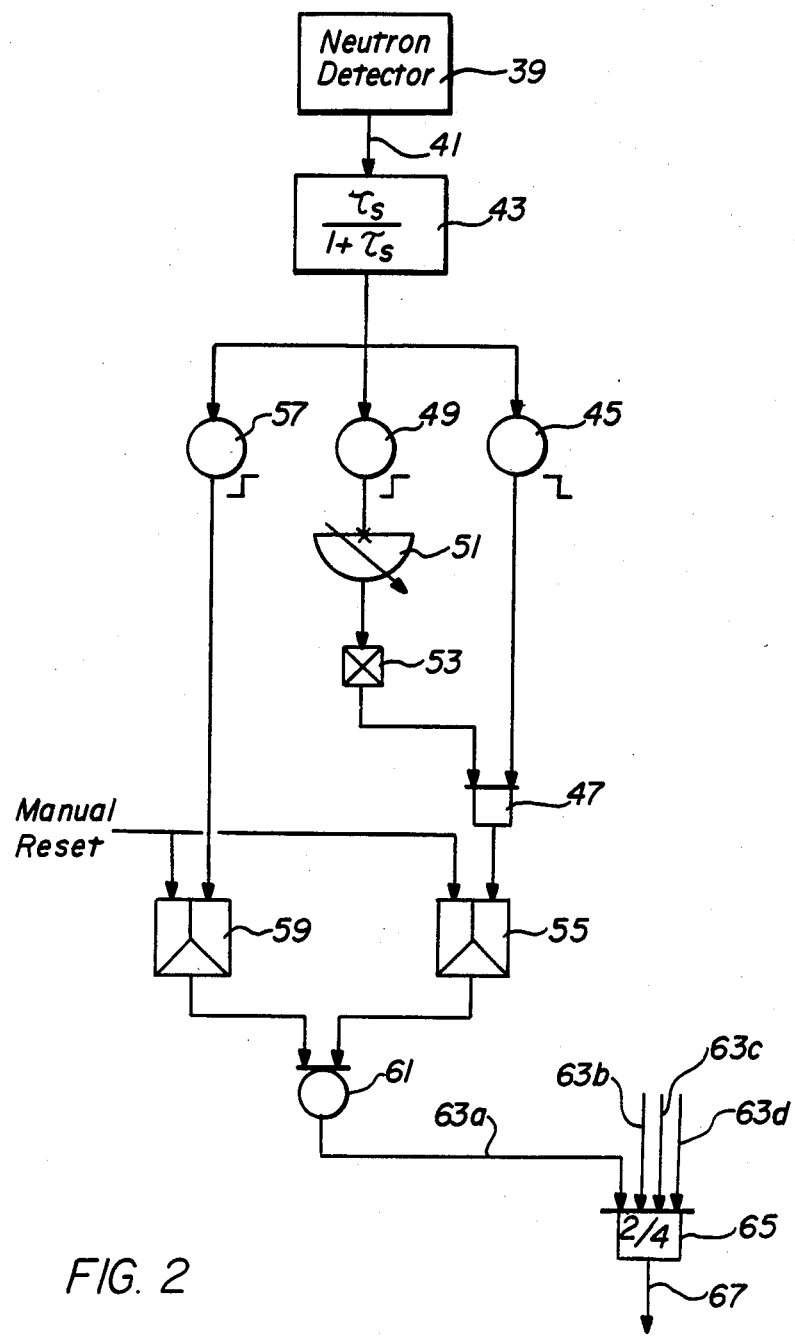
FIG. 2 is a schematic diagram of a portion of the control system of the power plant of FIG. 1 adapted for carrying out the invention.

Thus, a large loss of load results in a high positive flux rate followed by a large negative flux rate which could trip the reactor. The present invention prevents this unnecessary shutdown by inhibiting a trip in response to a large negative flux rate which is preceded by a high positive flux rate. FIG. 2 illustrates the portion of the control circuit 37 which carries out this control scheme. A similar circuit is provided for each of the detector channels 39. The neutron flux signal generated by the detector 39 is applied through lead 41 to a conventional dynamic rate-lag compensation circuit 43 which generates an output representative of the rate of change of the neutron flux. If the output of the dynamic rate-lag circuit is negative enough to exceed a preselected setpoint, characteristic of a dropped control rod, a negative rate bistable 45 will generate a logical ONE output. The output of bistable 45 is applied to a logical AND circuit 47.

If the output of dynamic rate-lag circuit 43 is more positive than a setpoint representative of the positive flux rate generated initially by a net load rejection (when the moderator temperature coefficient is so negative that a subsequent negative flux rate in excess of the negative flux rate setpoint may be expected), a bistable 49 generates a logical ONE output. This signal is applied to an adjustable time delay circuit 51 which generates a logical ONE output in response to a logical ONE input and maintains this output for the selected time interval after the input is removed. The output signal of time delay circuit 51 is inverted by logical NOT circuit 53 and applied as a second input to AND circuit 47. As long as the flux rate remains below the setpoint applied to bistable 49, NOT circuit 53 applies a logical ONE signal to AND circuit 47 so that the output of bistable 45 is gated to a memory 55. A logical ONE gated to memory 55 is retained until it is manually reset. It is evident from FIG. 2 that if the flux rate exceeds the positive setpoint applied to bistable 49, a logical ONE signal generated by bistable 45 within the time interval determined by time delay circuit 51 will be inhibited and will not be gated by AND circuit 47 to memory 55.

If the output of the dynamic rate-lag circuit 43 exceeds a second, high positive setpoint representative of the conventional high flux rate limit for the reactor used for control rod ejection protection, the output of a bistable 57 goes to a logical ONE. This signal is stored in a memory 59 until cleared by a manual reset signal. The outputs of memories 55 and 59 are applied through a logical OR circuit 61 and lead 63a to a two out of four coincidence circuit 65. Signals, which are referred to as partial trip signals, from similar circuits associated with the other three neutron flux detectors are applied to coincidence circuit 65 through leads 63b, c and d. The coincidence circuit generates a reactor trip signal on lead 67 whenever logical ONE signals appear on at least two of the four leads 61a through d. The trip signal on lead 67 is applied to the rod drive system 35 of FIG. 1 to shutdown the reactor through full insertion of all of the control rods 33 into the reactor core 5. Exemplary setpoints for bistables 45, 49 and 57 are about −5, +3 and +10 percent in about two seconds respectively.

Figure 3:
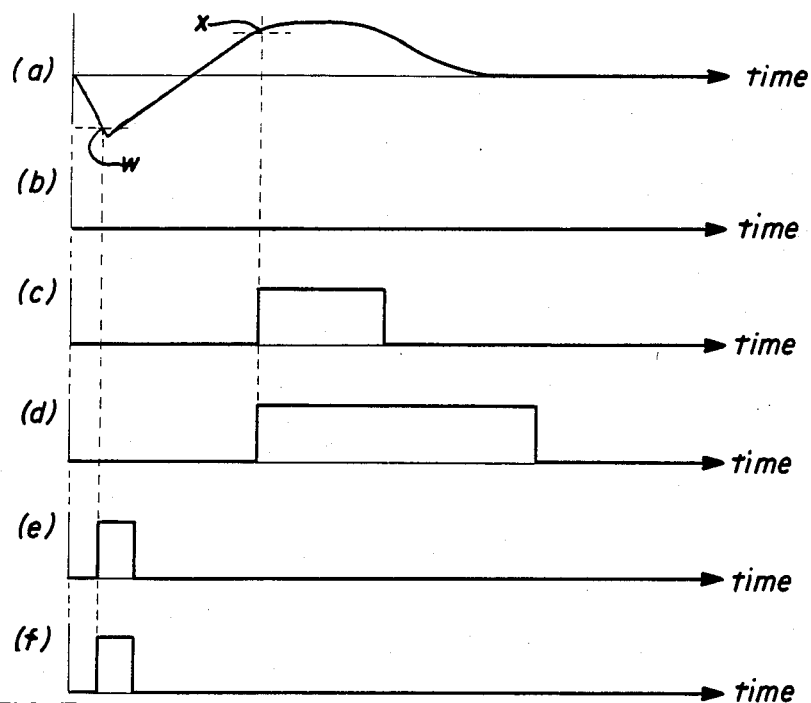
FIG. 3 is a time based diagram illustrating the temporal relationship of signals generated by the portion of the control system shown in FIG. 2 during a dropped control rod event.

FIG. 3 illustrates the operation of the circuit of FIG. 2 during a dropped rod event. Trace (a) represents the output of rate-lag circuit 43 and illustrates that the dropped rod induces an immediate decrease in the flux rate which becomes more negative than the setpoint of bistable at point W. As other control rods are extracted in response to the dropped rod, the flux rate becomes positive and at point X exceeds the setpoint of bistable 49. However, the flux rate does not become positive enough to generate a high flux rate trip as indicated by trace (b) which illustrates the output of bistable 57. The output of bistable 49 remains at the logical ONE level as long as the output of rate-lag circuit 43 remains above the setpoint of bistable 49 as shown in trace (c) causing the output of the time-delay circuit 51 to assume a logical ONE value for the preselected interval as shown in trace (d). However, since the negative flux rate limit was reached before the time-delay circuit output event to a logical ONE, as shown by traces (d) and (e), AND circuit 47 gates the output of bistable 45 to memory 55 and a partial trip signal is generated as indicated by trace (f). If at least one other channel also generates a partial trip signal; the two out of four coincidence circuit 65 will generate a reactor trip signal on lead 67.

Figure 4:
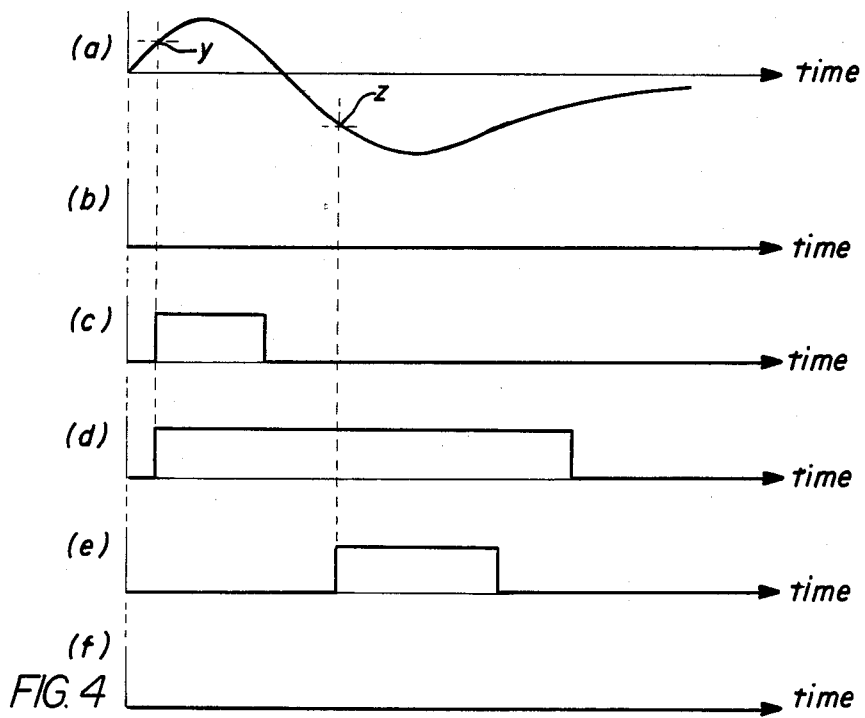
FIG. 4 is a time based diagram illustrating the sequencing of signals generated by the portion of the control system illustrated in FIG. 2 during a load rejection transient.

FIG. 4 illustrates the sequencing of the same signals during net load rejection. As shown by trace (a) the flux rate increases initially in response to the effects of turbine overspeed and exceeds the setpoint of bistable 49 at point Y. As the temperature increases due to the power imbalance is propogated to the core, the control systems take effect and the turbine speed begins to decrease, and the control rods are inserted in the core, the flux rate turns negative and at point Z becomes more negative than the setpoint of bistable 45. Trace (b) in FIG. 4 represents the output of bistable 57, and as can be seen from the drawing, the positive flux rate signal generated by rate-lag circuit 43 does not reach the high flux rate limit applied as the setpoint to this bistable during this transient so that its output remains low. Trace (c) represents the output of bistable 49 and it can be seen that it maintains a logical ONE value during the period that the output of rate-lag circuit 43 remains above its setpoint value. Trace (d) in FIG. 4 represents the output of time delay circuit 51 which generates a logical ONE output as long as the output of bistable 49 is a logical ONE, and maintains that output for a preset time interval after the output of bistable 49 returns to a logical ZERO level. Trace (e) represents the output of bistable 45 which goes to a logical ONE state at point Z when the flux rate becomes more negative than its setpoint, which represents a negative flux rate characteristic of a dropped rod, and remains at that value until the flux rate is again more positive than the setpoint. As can be seen from FIG. 4, the delay interval selected for time-delay circuit 51 is such that its output as represented by trace (d) remains at a logical ONE level until after the flux rate has again become more positive than the setpoint of bistable 45. Hence, the NOT circuit 53 applies a logical ZERO during this interval to the AND circuit 47 to inhibit generation of a reactor trip signal as indicated by trace (f) in FIG. 4.

Thus, it can be seen that according to the preferred form of the invention, a reactor trip signal is generated to shutdown the reactor if the preselected negative flux rate characteristic of a dropped rod is exceeded, but the reactor trip signal is inhibited if the preselected negative flux rate is preceded, within a preselected time interval, by a positive flux rate characteristic of a net load rejection. By selection of an appropriate time interval for inhibiting the trip, unnecessary trips in response to net load rejection are eliminated without unduly sacrificing protection from a dropped rod.

The normal high flux rate trip on a typical PWR is set at a rate of about +5 percent in about 2 seconds. The preferred embodiment of the proposed invention relaxes that high flux trip setpoint to about +10 percent and adds a second positive flux rate setpoint of typically +3 percent as discussed above. Other methods can be used for detecting a net load trip for use in inhibiting the negative flux rate trip. For instance, without relaxation of the positive flux rate trip setpoint, that is maintaining the single +5 percent positive flux rate trip setpoint, the high positive and negative flux rate trips can be inhibited for a preset time period after detection of the frequency and/or reactor coolant pump speed transient associated with a net load trip. Alternatively, in conjunction with relaxation of the positive flux rate trip setpoint, the negative flux rate trip can be inhibited: based upon a preselected difference between nuclear flux and turbine load or; when the plant breaker is open or; when both turbine load protection channels read below a preset load.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of operating the reactor of a nuclear power plant comprising the steps of:
    monitoring the rate of change of reactor neutron flux;
    shutting down the reactor when the rate of change of neutron flux becomes more negative than a preselected negative value corresponding to that caused by a dropped reactor control rod;
    monitoring operation of the nuclear power plant to detect a loss of load of a magnitude which generates a rate of change in neutron flux more negative than said preselected negative value within a predicted period of time after detection of said loss of load; and
    inhibiting shutdown of the reactor in response to the rate of change of neutron flux becoming more negative than said preselected value for a predetermined time period after detection of said loss of load, said predetermined time period being longer in duration than said predicted time period.

2. The method of claim 1 wherein said step of detecting said loss of load of a magnitude which generates said rate of change of neutron flux more negative than said preselected negative value comprises comparing said rate of change with a preselected positive rate of change corresponding to such loss of load.

3. A protection system for the reactor in a nuclear power plant comprising:
    means for monitoring the rate of change of reactor neutron flux;
    means responsive to a negative rate of change in the neutron flux which is more negative than a preselected negative value for shutting down the reactor; and
    means responsive to a positive rate of change in the neutron flux which exceeds a preselected positive value thereof for inhibiting subsequent operation of said means to shutdown the reactor, whereby the reactor is not shutdown even though a rate of change of the neutron flux becomes more negative than said preselected negative value when the rate of change of said neutron flux has already exceeded said preselected positive value.

4. The protection system of claim 3 wherein said inhibiting means includes means for inhibiting said shutdown means for only a predetermined time period measured from the time that the rate of change of neutron flux exceeds said preselected positive value.

5. The protection system of claim 4 for a reactor having a negative moderator temperature coefficient, wherein said means responsive to a negative rate of change in neutron flux rate comprises means responsive to a negative rate of change more negative than a preselected negative value corresponding to the value of the rate of change of neutron flux resulting from a dropped control rod in the reactor and wherein said means responsive to a positive rate of change of neutron flux comprises means responsive to a positive rate of change which exceeds a positive value corresponding to the value of the rate of change of neutron flux resulting from a loss of a substantial amount of load carried by the nuclear power plant when the moderator temperature coefficient is so negative that said loss of a substantial amount of load generates a subsequent negative flux rate more negative than said preselected negative value.

6. The protection system of claim 5 wherein said means for shutting down the reactor in response to a neutron flux rate more negative than said preselected negative flux rate comprises: means for comparing said neutron flux rate to a first setpoint signal representative of said preselected negative flux rate to generate a trip signal when the flux rate signal is more negative than said setpoint signal, and means responsive to said trip signal for inserting control rods into the reactor to shut it down, and wherein said inhibiting means comprises gating means for gating the trip signal to the rod insertion means in response to a gating signal of a first value and for blocking the trip signal from reaching the insertion means in response to a second value of the gating signal, and means for comparing the rate of change of the neutron flux signal with a second setpoint signal representative of said selected positive flux rate to generate said gating signal, said gating signal having said second value for said predetermined time period after said flux rate exceeds said second setpoint signal and having said first value otherwise.

7. In combination:
    a nuclear power plant having a reactor with control rods; and
    a protection system for protecting the reactor from the consequences of a dropped reactor control rod while precluding unnecessary shutting down of the reactor in response to a loss of load, said system comprising:
    means for monitoring the rate of change of reactor neutron flux;
    means responsive to said monitoring means for shutting down the reactor when the rate of change of the neutron flux becomes more negative than a preselected negative value indicative of a dropped rod condition; and
    means responsive to a loss of load on the plant of a magnitude to generate within a specified period of time a negative flux rate more negative than said preselected negative value, for inhibiting said shutdown means.

8. The combination of claim 7 wherein said inhibiting means includes timing means for inhibiting said shutdown means for a preselected interval which exceeds said specified time period.

9. The combination of claim 8 wherein said inhibiting means includes means responsive to a preselected positive value of said neutron flux rate corresponding to the rise in neutron flux rate caused by said loss of load for inhibiting said shutdown means.

* * * * *